(12) United States Patent
Raghavachari

(10) Patent No.: US 8,095,146 B2
(45) Date of Patent: Jan. 10, 2012

(54) METHOD AND SYSTEM FOR DIRECTING A WIRELESS USER TO A LOCATION FOR IMPROVED COMMUNICATION

(75) Inventor: Mukund Raghavachari, Baldwin Place, NY (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 508 days.

(21) Appl. No.: 10/674,613

(22) Filed: Sep. 30, 2003

(65) Prior Publication Data

US 2005/0070302 A1 Mar. 31, 2005

(51) Int. Cl.
*H04W 24/00* (2009.01)

(52) U.S. Cl. .................. 455/456.1; 455/456.2; 455/457; 455/9

(58) Field of Classification Search ............... 455/456.1, 455/414.1, 414.2, 422.1, 423, 452.1, 424, 455/453, 513, 512, 9, 10, 67.13, 67.14, 67.11
See application file for complete search history.

(56) References Cited

U.S. PATENT DOCUMENTS

| | | | |
|---|---|---|---|
| 5,815,814 A | 9/1998 | Dennison | |
| 5,844,522 A | 12/1998 | Sheffer et al. | 342/457 |
| 5,873,041 A * | 2/1999 | Ishii | 455/457 |
| 5,943,014 A | 8/1999 | Gilhousen | 342/465 |
| 5,983,115 A | 11/1999 | Mizikovsky | |
| 6,038,444 A * | 3/2000 | Schipper et al. | 455/421 |
| 6,487,410 B1 * | 11/2002 | Kontio et al. | 455/437 |
| 6,771,609 B1 * | 8/2004 | Gudat et al. | 370/254 |
| 6,909,902 B1 * | 6/2005 | Sawada et al. | 455/456.1 |
| 7,167,679 B2 * | 1/2007 | Sano | 455/41.2 |
| 7,197,320 B2 * | 3/2007 | Joseph | 455/456.1 |
| 7,251,491 B2 * | 7/2007 | Jha | 455/441 |
| 7,400,892 B1 * | 7/2008 | Banks et al. | 455/456.5 |
| 2003/0193910 A1 * | 10/2003 | Shoaib et al. | 370/331 |
| 2004/0152362 A1 * | 8/2004 | Carter et al. | 439/660 |
| 2004/0203998 A1 * | 10/2004 | Knauerhase et al. | 455/550.1 |
| 2005/0025181 A1 * | 2/2005 | Nazari | 370/469 |
| 2005/0185615 A1 * | 8/2005 | Zegelin | 370/331 |
| 2006/0030334 A1 * | 2/2006 | Hashimoto | 455/456.1 |

FOREIGN PATENT DOCUMENTS

| | | |
|---|---|---|
| JP | 07-038961 | 2/1995 |
| JP | 08-181649 | 7/1996 |
| JP | 11-163784 | 6/1999 |
| JP | 11-313373 | 11/1999 |
| JP | 2002-291048 | 10/2002 |
| JP | 2003-065785 | 3/2003 |
| JP | 2003-199158 | 7/2003 |

* cited by examiner

*Primary Examiner* — Kwasi Karikari

(74) *Attorney, Agent, or Firm* — Michael J. Buchenhorner

(57) ABSTRACT

An information handling system for improving reception comprises logic for determining a target location for improved communication for a wireless telecommunication unit based in part on information representing a recent position of the wireless telecommunication unit, wherein the target location is more likely to result in better reception of wireless signals from a wireless access point. The system also includes a transceiver for receiving and transmitting signals to other users of the network. Optionally, the transceiver can be configured for receiving information representing the most recent position of the wireless unit and for transmitting directions to the wireless unit, the directions including information on how to get to the target location.

25 Claims, 4 Drawing Sheets

METHOD AND SYSTEM FOR DIRECTING A WIRELESS USER TO A LOCATION FOR IMPROVED COMMUNICATION

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of telecommunications, and more particularly relates to the field of obtaining a strong wireless communication link.

BACKGROUND OF THE INVENTION

Wireless communication has become an indispensable part of everyday life. Accordingly, the acquisition of a good wireless link to a network is of critical importance, especially where the communication involves both voice and data. However, currently even within a small area like a room the wireless network reception may vary greatly depending on the location of the wireless unit. Laptop computers and mobile phones display the current level of reception quality but do not direct a user to locations where reception may be improved. Without such information bandwidth as well as connection quality may be significantly affected. Therefore, there is a need for a wireless communication system that overcomes the drawbacks discussed herein.

SUMMARY OF THE INVENTION

An information handling system for improving reception comprises logic for determining an improved location for a wireless telecommunication unit based in part on information representing a recent position of the wireless telecommunication unit. The improved location is more likely to result in better reception of wireless signals from any of a plurality of wireless access points. The system also includes a transceiver for receiving and transmitting signals. Optionally, the transceiver can be configured for receiving information representing the recent position of the wireless unit and for transmitting directions to the wireless unit, the directions including information on how to get to the improved location. The invention can be implemented in the wireless telecommunication unit or in a base station that provides an interface between the wireless telecommunication unit and a wired network.

DETAILED DESCRIPTION

Figure 1:
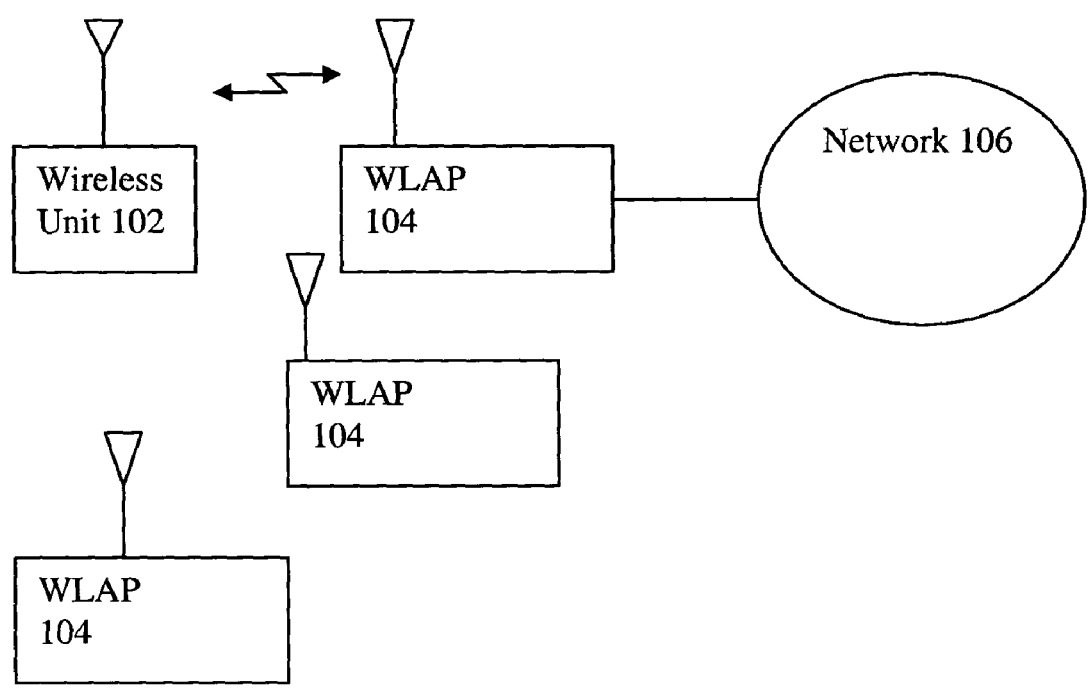
FIG. 1 is an illustration of a communication network including wireless telecommunications units and wireless access points according to the present invention.

Referring to FIG. 1, there is shown a simplified depiction of a communication network 100 including at least one wireless telecommunications unit (or wireless unit or client) 102 and wireless access points (or WLAPs, e.g., base stations) 104 all connected to a network 106. The wireless unit 102 maintains contact with a network 106, such as a wireless local area network (LAN), via the WLAPs 104. We discuss two embodiments of a system and method for providing directions to a wireless unit 102 for improving reception according to the present invention. Other embodiments are also possible without departing from the scope of the invention.

In a first embodiment, the wireless unit 102 includes all of the hardware, software, and data for determining whether there is a location within the communication network 100 where an improved communication link (e.g., better reception) can be achieved. The wireless unit 102 is discussed in detail with reference to FIG. 3. In a second embodiment, the wireless unit is a thin client in the sense that it derives its ability to determine a location for improved communication from the WLAP 104 or other nodes in the network 100. The WLAP 104 is discussed in detail with reference to FIG. 4.

Figure 2:
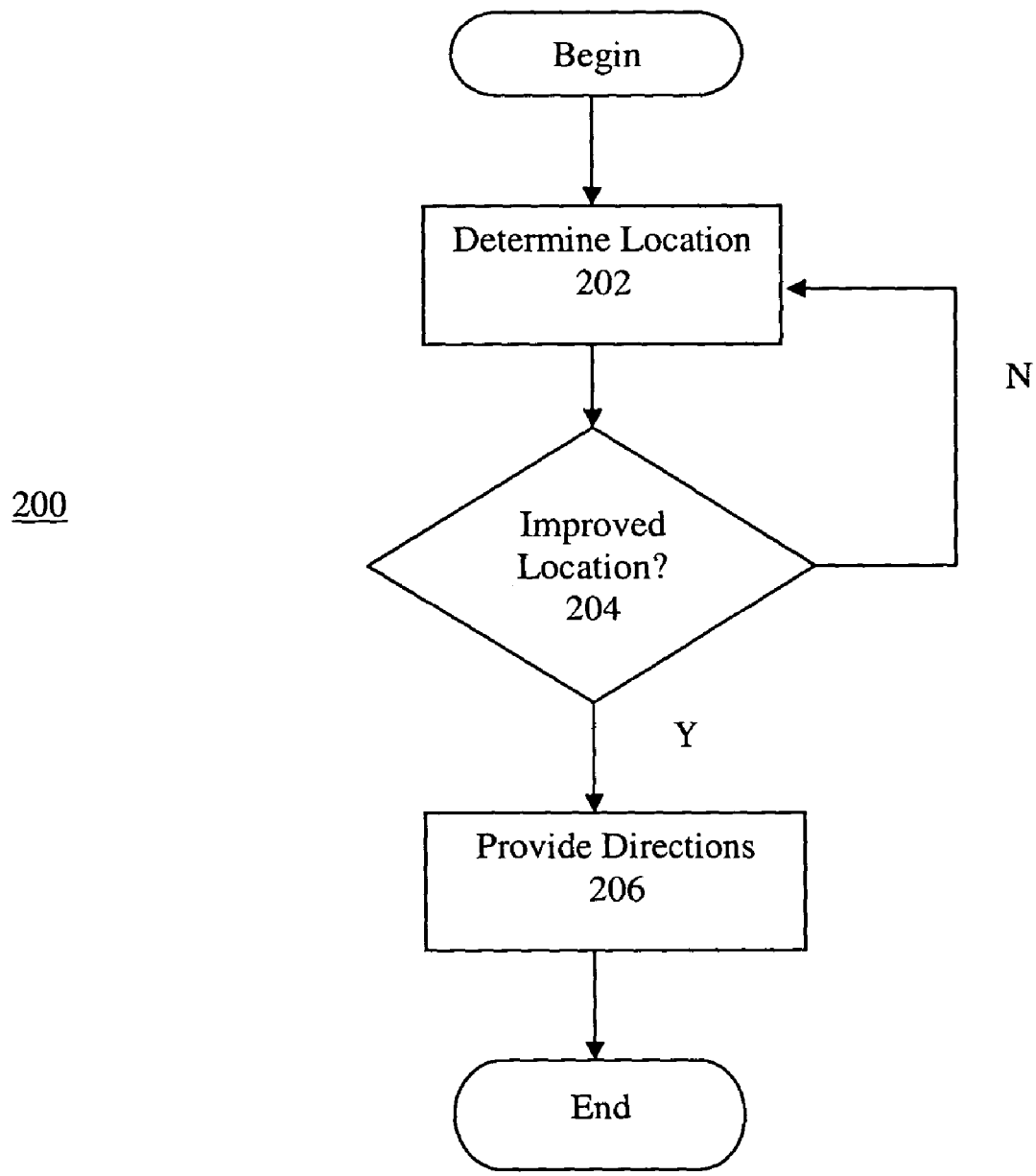
FIG. 2 is a flow chart of a method using the invention.

FIG. 2 is a flow chart of a method 200 according to another embodiment of the invention. The method 200 for directing a wireless unit 102 to a location for better communication can be performed by the wireless unit 102, by the WLAP 104 or a combination of both. This method can be activated in one of two ways. In automatic mode, the wireless unit 102 or WLAP 104 can be constantly gauging its reception strength and seeking a stronger reception. In fail-safe mode, the wireless unit 102 or the WLAP 104 will seek a location for better reception only when the strength of its signal falls below a predetermined threshold. In step 202 we determine where the wireless unit 102 was most recently located. We say "most recently" because it is presumed that the wireless unit 102 is likely to have moved during the time it takes to process its location. This makes the determination of the wireless unit's "present" location an uncertain task.

In decision 204 we determine whether there exists an improved location to obtain better communication between the wireless unit 102 and the LAN 106 and if there is such an improved location the wireless unit 102 is informed of the improved location. If there is a location where improved reception can be achieved, the method continues at step 206 wherein the target location is displayed and directions to that location are provided to the user of wireless unit 102. By "directions" we mean any instructions to navigate to a different location where reception is likely to improve. The directions can take the form of text, audio or video messages, a map or a combination thereof. Since location of the wireless unit 102 is actually gauged by the location and orientation of the antenna, directions to an improved location may be simply to change the directional orientation of the antenna, for example, by pointing the antenna in a different direction.

The likelihood that a wireless unit 102 can improve its communications with the LAN 106 is preferably determined by referring to a database (or table) of locations throughout the network 100 and quality communication at each of those locations. This information can be based on historical data on received signal strength at the locations and can be enhanced by information on the environment of those locations. For example, if it is known that one must traverse a tunnel between the wireless unit's latest recorded location and another location then a system performing the process 200 will take this into consideration in providing instructions to the user of the wireless unit 102. Other lower level steps or acts can be performed in various implementations of the method 200.

The step 202 of determining where the wireless unit 102 is most recently located may further comprise a step of receiving a global positioning system signal relating to a recent location of the wireless unit 102. The method could then further include the step of using the received information to calculate the position of the wireless unit 102. The step 206 can comprise sending a map showing a user of the wireless unit 102 how to get to the improved location. The step 206 may further comprise sending a text message comprising step-by-step instructions showing a user of the wireless unit 102 how to get to the improved location. The step 206 may further comprise sending an audio message comprising instructions showing a user of the wireless unit 102 how to get to the improved location or sending a video message comprising instructions showing a user of the wireless unit 102 how to get to the improved location.

Figure 3:
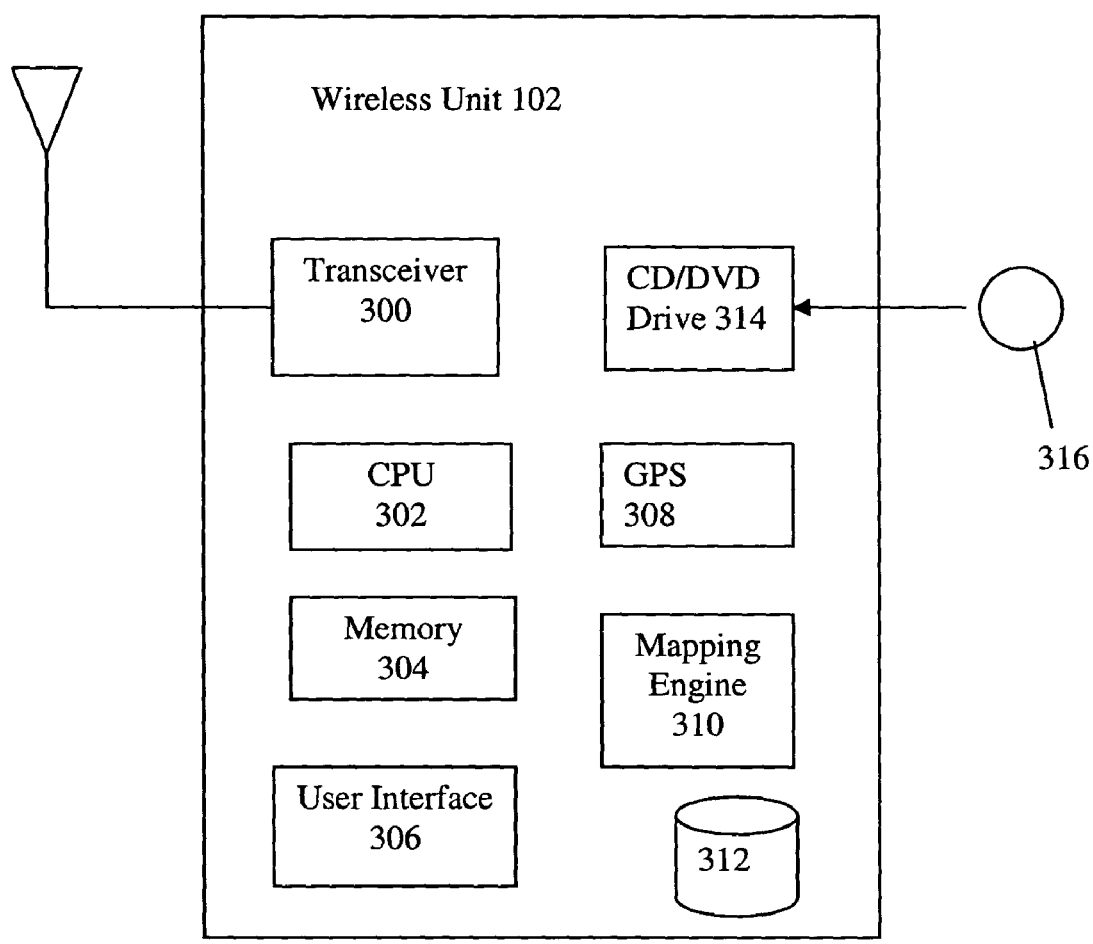
FIG. 3 is a simplified block diagram of a wireless communication unit according to an embodiment of the invention.

Referring to FIG. 3, there is shown a simplified block diagram of the wireless communication unit 102 according to an embodiment of the invention wherein the wireless unit 102 can determine its own location and the directions to a location where improved communication can be obtained. The unit 102 is preferably an information processing system such as a laptop computer or personal digital assistant comprising a central processing unit (CPU) 302, a memory 304 for storing instructions and data and a user interface 306 which may include a keyboard, mouse, screen and other input/output devices used in such systems. The wireless telecommunications unit 102 also comprises a transceiver 300 for sending signals to and receiving signals from the wireless LAN 106. In this embodiment, the unit 102 comprises a location-determining mechanism 308 that may comprise a global positioning system (GPS) for receiving signals used for determining the location of the unit 102. The unit 102 also comprises a database of maps 312 and a mapping engine 310 for using the map information of the database 312 to construct a customized map for the user's immediate needs. The mapping engine 310 receives instructions from the user via the user interface 306 and displays the resulting directions (including a map) via the same interface 306.

The wireless unit 102 further comprises a removable media storage device 314 used for storing instructions for the CPU 302. The removable media can take the form of a digital video disk (DVD) 316 or a compact disk (CD).

Figure 4:
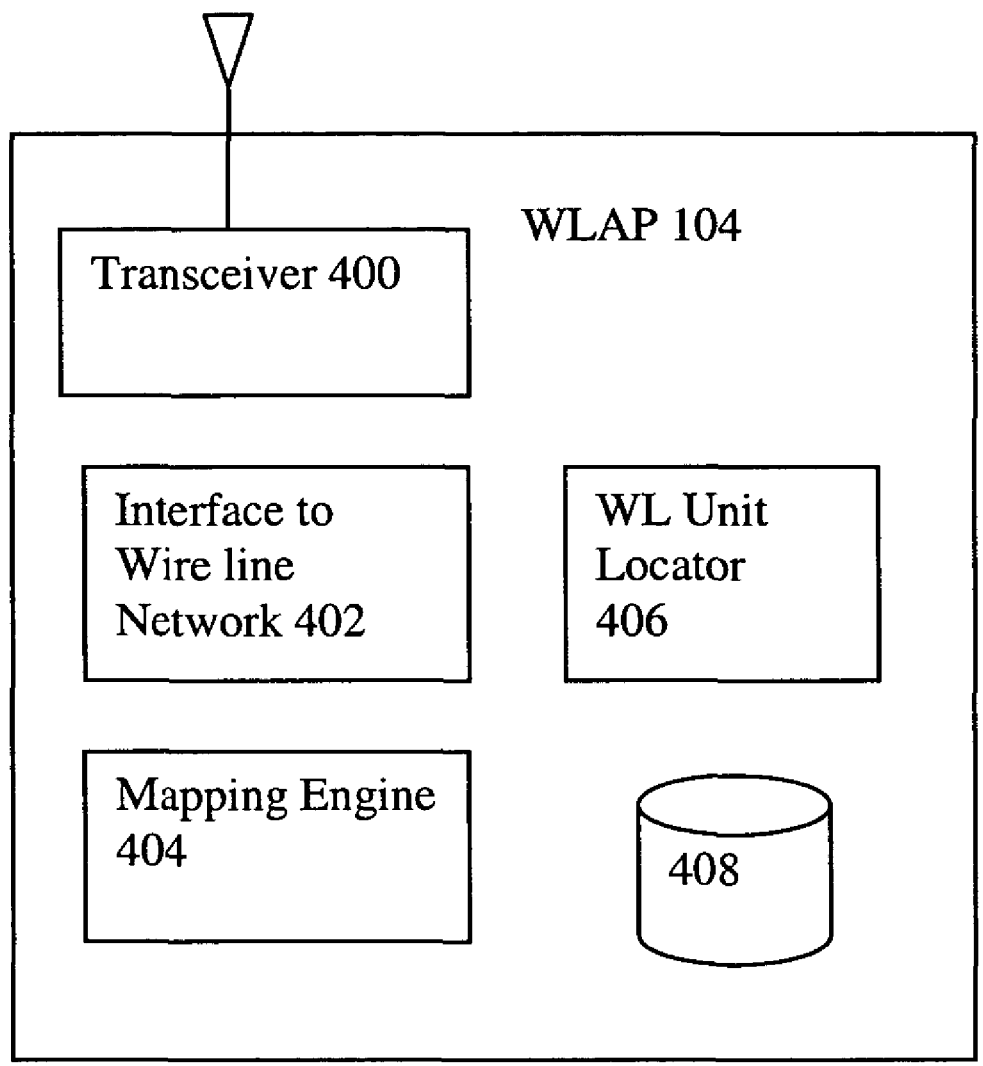
FIG. 4 is a simplified block diagram of a wireless access point according to another embodiment of the invention.

Referring to FIG. 4 there is shown a simplified block diagram of a wireless access point 104 according to another embodiment of the invention. The wireless access point 104 is possibly a mobile telephone base station or any other suitable interface between a wired telecommunications LAN 106 and a plurality of wireless telecommunications units 102. The WLAP 104 comprises a transceiver 400 for communicating with the wireless unit 102. An interface to the wired network 402 (e.g., a public switched telephone network) comprises hardware and software required to implement a communication protocol (e.g., code-division multiple access or CDMA).

The WLAP 104 further comprises a mapping engine 404. The mapping engine 404 can be implemented as software or hardware for accessing a database of maps 408 that can be processed according to a user request and served to the user. Generally such mapping information is stored at a location remote from the wireless unit 102 or the WLAP 104 but with increased mobile storage capacities the mapping information can also be stored at the wireless unit 102 or the WLAP 104 or elsewhere in the network 100. Therefore, the mapping engine 404 is shown as being encompassed by the WLAP 104. The database 408 can be any commercially available data base product such as IBM's DB2® or any other suitable collection of information. The information stored in the database 408 can be based on historical data or can be collected real-time from various wireless units throughout the wireless network 100 so that the stored information is updated dynamically.

The WLAP 104 may further comprise a GPS. The GPS is possibly a part of the WLAP 104 and derives its position information from information received from an orbiting satellite system but other positioning means such as triangulation can be used to determine the location of the wireless unit 102. The user can select the range of the area for which directions are provided by entering a request for directions only for a given area. Alternatively, the wireless unit 102 can monitor the location of the user, periodically providing directions to the user for improving reception. The user could also select an option where the wireless unit 102 provides an indication that better reception is available near the present location. If the user is interested he or she can request directions.

The WLAP 104 further comprises a wireless unit locator 406 that determines the location of the wireless unit 102 in a manner the same as or similar to how the wireless unit 102 determines its own location or by other means such as triangulation. However, in this embodiment the WLAP 104 can use any of various means to determine the location of the wireless unit 102 and then it transmits signals to the wireless unit 102 enabling the wireless unit 102 to know its location. In addition to knowing the wireless unit's most recent location the WLAP 104 (or the wireless unit 102) can calculate a future location by monitoring the location and velocity of the wireless unit 102. Having determined the future location of the wireless unit 102 the system 100 can provide the user with the projected strength of signal at the future location and perhaps even offer alternative routes where better reception can be achieved and maintained. The system can optionally include geographic or geological information that can be used to determine a location for achieving improved communication. Thus, the system 100 could factor the presence of a mountain, building, or a body of water in providing directions to the user.

The system is also operable to receive a history of reception strength indications from at least one wireless unit 102 to develop a database of positions each associated with reception strength. The system 100 can also be configured so that the logic for determining an improved location comprises an application specific integrated circuit (ASIC).

The instructions provided to the user of the wireless unit 102 can also comprise an indication of areas of weak or no coverage. Thus, the user could use a device according to the invention to avoid those areas.

Therefore, while there have been described what are presently considered to be the preferred embodiments, it will be understood by those skilled in the art that other modifications can be made within the spirit of the invention.

I claim:

1. An information handling system comprising:
   a wireless unit configured for moving within a network, said wireless unit comprising:
   a location determining mechanism;
   a transceiver; and
   an input/output interface;
   a wireless access point for facilitating contact between the wireless unit and the network;

logic for determining: a target position for improved communication for the wireless unit based in part on information representing a recent position of the wireless unit and based in part on historical data on received signal strength at the recent and target positions;

a transmitter for transmitting directions to a user of the wireless unit to be presented on the input/output interface, the directions including information directing the user of the wireless unit to move the wireless unit to the target position for improved reception;

wherein changing a position of the wireless unit from the recent position to the target position is more likely to result in improved reception and transmission of wireless signals to and from the wireless access point; and a database for storing information relating to position and related data on wireless reception quality, and wherein the information stored based on historical data on received signal strength at the recent and target positions is enhanced by information on an environment of the recent and target positions.

2. The system of claim 1 wherein the logic for determining the target position comprises a mapping device for defining the target position.

3. The system of claim 1 wherein the database is dynamically updateable based on reception strength input received from a plurality of wireless units.

4. The system of claim 1 wherein the logic for determining the target position comprises an application specific integrated circuit.

5. The system of claim 1 wherein the transceiver is configured for receiving information representing the recent position of the wireless unit and for transmitting directions to the wireless unit, the directions including information directing a user of the wireless unit to the target position.

6. The system of claim 1 wherein the information on the environment of the recent and target positions comprises topographical information.

7. In a wireless network comprising access points and wireless clients, a method for directing a user of a wireless client to move the wireless client to a target position for improved communication, comprising:

activating a location-determining mechanism for determining a most recent position of the wireless client, wherein the activating step is triggered in one of two modes: automatic and fail-safe;

wherein the automatic mode comprises constantly seeking a stronger reception;

wherein the fail-safe mode comprises activating the location-determining mechanism only when the reception strength falls below a predetermined threshold; and using a database comprising a history of communication quality at various positions, wherein said history is enhanced by information on an environment of the recent and target positions;

using a wireless unit locator for determining, based on the history of communication quality on received signal strength at the most recent and target positions, whether there exists the target position for improved communication between the wireless client and the access point;

using a transceiver for providing information to the wireless client, the information comprising the target position and navigation directions to the target position; and sending an audio message comprising instructions indicating to the user of the wireless unit how to get to the improved location.

8. The method of claim 7 wherein the step of determining the most recent position of the wireless client further comprises receiving a global positioning system signal.

9. The method of claim 7 wherein the step of sending information to the user of the wireless client further comprises at least one step from among the steps of:

providing a map illustrating a route to the target position;

providing a text message comprising navigation instructions to the target position; and providing a video message comprising navigation instructions to the target position.

10. The method of claim 7 further comprising dynamically updating the database as new data on communication quality are determined.

11. The method of claim 7 wherein the step of providing information comprises providing information relating to target positions within a destination area provided by the wireless client.

12. The method of claim 7 wherein the information provided to the user of the wireless client is based on data relating to the wireless client's most recent position, direction and velocity.

13. The method of claim 7 wherein the step of determining the wireless client's most recent position comprises using triangulation.

14. The method of claim 7 wherein the information on the environment of the recent and target positions comprises topographical information.

15. A computer program product embodied on a computer readable medium and comprising computer program code that, when executed, causes a computer to:

direct a user of a wireless client to move from a recent position to a target position for improved communication by:

using a database comprising a history of communication quality at various positions including the recent and target positions, wherein said history of communication quality is enhanced by information on an environment of the recent and target positions;

determining, based on the history of the communication quality on received signal strength at the recent and target positions, the recent location of the wireless client in a wireless network determining whether there exists the target position for improved communication between the wireless client and the network;

sending a message comprising instructions indicating to the user of the wireless unit how to get to the target position for improved communication; and providing directions to the target position when it is determined that there exists the target position for improved communication.

16. The computer program product of claim 15 further comprising computer program code for receiving a global positioning system signal.

17. The computer program product of claim 16 wherein the computer program code for providing directions further comprise at least one instruction from among the instructions:

providing a map illustrating a route to the target position;

providing a text message comprising navigation instructions to the target position; and providing a video message comprising navigation instructions to the target position.

18. The computer program product of claim 15 further comprising computer program code using information on the most recent location, direction, and velocity of the wireless client to project the target position for the wireless client where improved communication is likely.

19. The computer program product of claim 15 wherein the information on the environment of the recent and target positions comprises topographical information.

20. A wireless telecommunication unit comprising:
   processor logic for
   determining, based on historical data on received signal strength at a recent position and a target position of the wireless telecommunication unit, the target position for improved reception for the wireless telecommunication unit based in part on information representing the recent position of the wireless unit, wherein changing the position of the wireless unit from the recent position to the target position is more likely to result in improved reception of wireless signals from a wireless access point; and
   a transmitter for transmitting to a user of the wireless unit directions to move the wireless unit to said target location;
   a database for storing information relating to position and related data on wireless reception quality, and wherein the information stored based on historical data on received signal strength at the recent and target positions is enhanced by information on an environment of the recent and target positions;
   a user interface for presenting the directions; and
   a transceiver for receiving and transmitting the wireless signals.

21. The wireless telecommunication unit of claim 20 further comprising a global positioning system.

22. The wireless telecommunication unit of claim 20 wherein the processor logic comprises a programmable processor and program instructions.

23. The wireless telecommunication unit of claim 20 wherein the processor logic comprises an application-specific integrated circuit.

24. The wireless telecommunication unit of claim 20 further comprising a database storing information relating to position and related data on wireless reception quality at the recent and target positions.

25. The wireless communication unit of claim 20 wherein the information on the environment of the recent and target positions comprises topographical information.

* * * * *